July 10, 1923.
A. L. SHANER
ROPE HITCH
Original Filed June 7, 1922
1,461,498
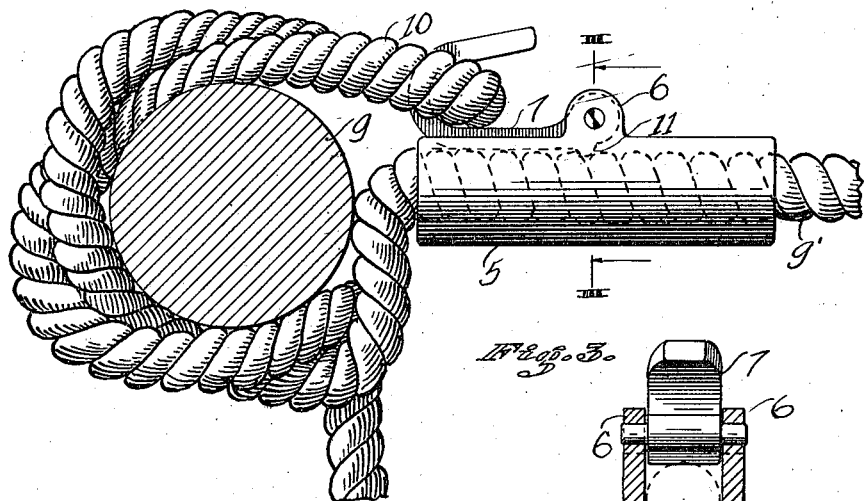
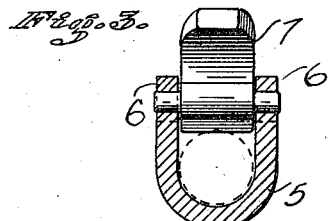
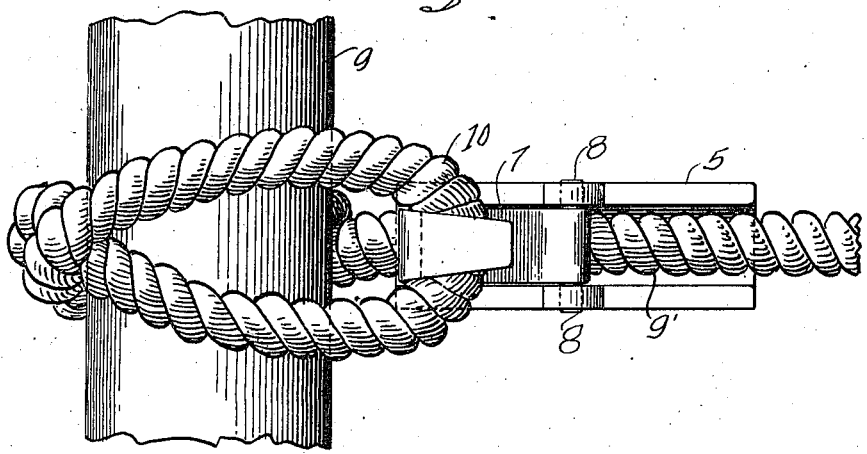
Inventor
ARTHUR L. SHANER
By Victor J. Evans
Attorney Patented July 10, 1923.

1,461,498

UNITED STATES PATENT OFFICE.

ARTHUR L. SHANER, OF SAN FRANCISCO, CALIFORNIA.

ROPE HITCH.

Application filed June 7, 1922. Serial No. 566,485.

*To all whom it may concern:*

Be it known that I, ARTHUR L. SHANER, a citizen of the United States, residing at San Francisco, in the county of San Francisco and State of California, have invented new and useful Improvements in Rope Hitches, of which the following is a specification.

This invention relates to a snubbing hook and has for its principal object the provision of a device for eliminating the necessity of tying and untying knots.

A further object of this invention is to provide a device of the character described, which prevents fraying of the rope, and a device which will double the life of a rope, and also be a saving in the quantity of the rope used.

Another object of this invention is to produce a device of the character described which is simple in construction, economical to manufacture, and highly serviceable in use.

Other objects and advantages will be apparent during the course of the following description.

In the accompanying drawings forming a part of this specification, and in which like numerals are employed to designate like parts throughout the same, Fig. 1 is a side elevation of the device constructed in accordance with my invention, and showing a timber or rod associated therewith, Fig. 2 is a top plan view of the device, and Fig. 3 is a transverse vertical section through the hook, the view being taken on the line III—III of Figure 1.

Great annoyance has been experienced in the tying and untying of knots, due to the fact that this task requires a laborious and lengthy procedure. Furthermore, in the tying and untying of knots the rope is frequently frayed and after a number of uses a new rope has to be supplied. To overcome this inconvenience and to furnish the trade with a device that will eliminate the necessity of tying and untying knots, I have devised a novel type of hitch in which the numeral 5 designates a sleeve made of iron or other suitable material and of substantially U shaped formation in cross section and provided with intermediately disposed extensions 6.

The numeral 7 designates a hook shaped member which has provided thereon lugs 8 which lugs are mounted in the extensions 6 of the sleeve and forming a pivotal connection.

In order that the application of the device may be correctly illustrated, I have shown a pole 9 which can be either a piece of timber or any other element of a corresponding nature, in conjunction with which my hook will be used.

In practice the end of a rope is inserted through the sleeve 5 and then twisted, as illustrated to advantage in Figures 1 and 2, so as to form a loop 10, which loop is received by the hook element 7. The cooperation of the loop and the hook, as shown in Figure 1, will assure a positive tightening of the rope about the timber and any additional pull exerted on the rope will only serve to assure a securer and more positive tightening action.

In order that any loss of the grip on the rope may be eliminated, I have provided a locking lug or boss 12 on the hook member, which boss is adapted to contact with the rope and thus prevent a loosening or loss of the hitch. It is to be understood, that when the loop is first inserted through the sleeve 5 that the hook member is raised so as to allow a free passage of the rope therethrough, and then is allowed to assume its normal position, as illustrated in Figure 1, gripping the rope and preventing a loss of the hitch. When the operator desires to release the rope, the hook is again raised and then the rope can be readily drawn through the sleeve.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

A device of the character described, comprising a U shaped sleeve adapted to receive a rope therein, and a hook element pivotally secured to said U shaped sleeve, said hook element having a boss formed therein and adapted to lie within said U shaped sleeve when said hook is parallel to said sleeve, said hook being adapted to receive a loop of said rope after said rope has been secured around an object for the purpose of maintaining said boss in contact with said rope within said sleeve.

In testimony whereof I affix my signature.

ARTHUR L. SHANER.